Jan. 13, 1959  K. FOYN ET AL  2,868,860
FURNACE FOR STEEL PRODUCTION
Filed Aug. 8, 1955  2 Sheets-Sheet 1
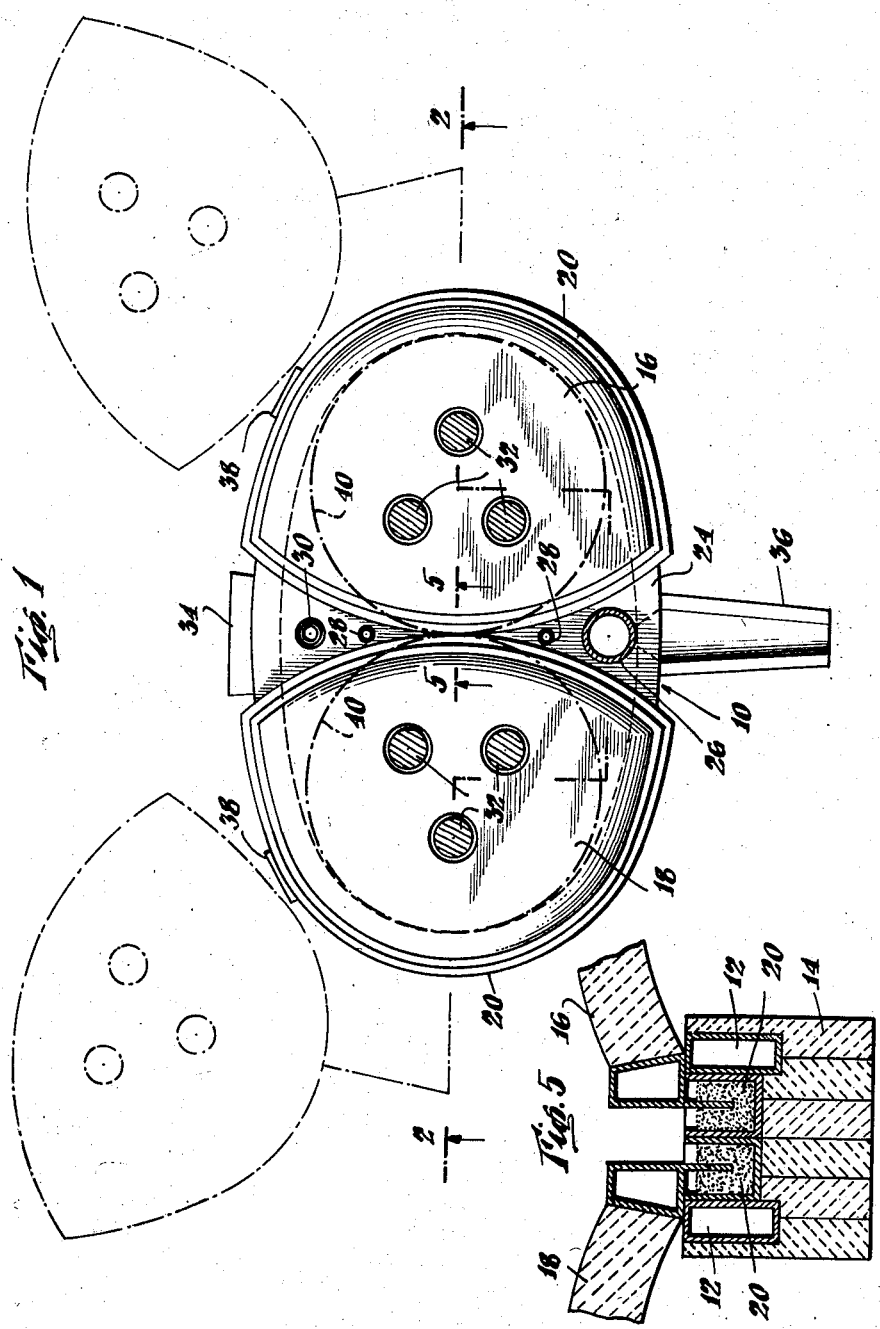
INVENTORS
Kjeld Foyn
Einar Gornitzka
BY
ATTORNEYS

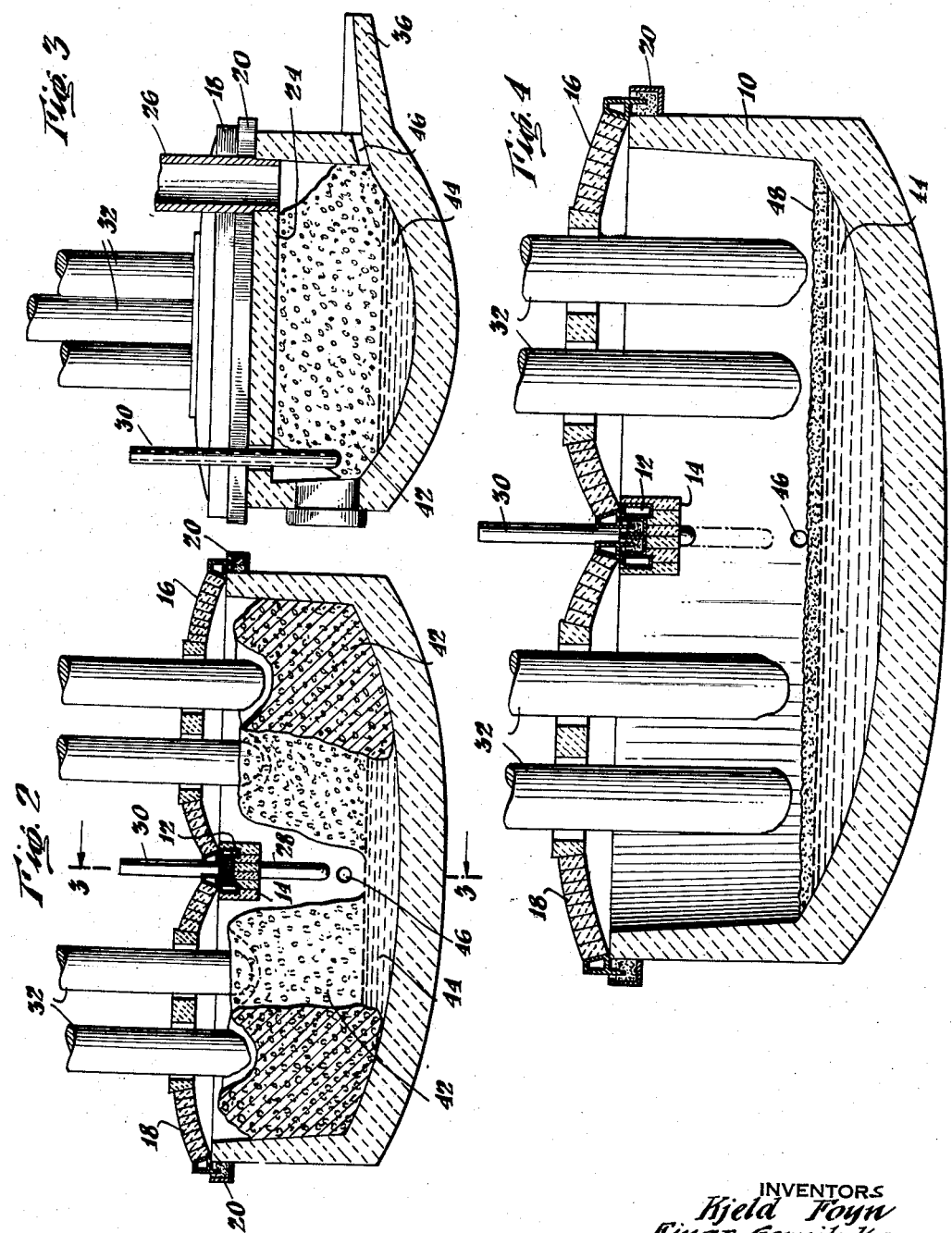

United States Patent Office 2,868,860
Patented Jan. 13, 1959

2,868,860
FURNACE FOR STEEL PRODUCTION

Kjeld Foyn, Oslo, and Einar Gornitzka, Smestad, Oslo, Norway, assignors to Elektrokemisk A-S, Oslo, Norway, a corporation of Norway Application August 8, 1955, Serial No. 527,038

Claims priority, application Norway September 22, 1954

7 Claims. (Cl. 13—9)

This invention relates to a furnace to be used in steel making.

In the present-day methods of producing usual commercial steels, it is customary to combine melted pig iron and scrap. The pig iron must be decarburized. This is usually done by melting iron ore with the pig iron. This process of decarburizing can be speeded up if the melted iron is blown on its surface with oxygen.

The furnace of the present invention is designed to permit the simultaneous decarburation of pig iron and the melting of the scrap in a manner not possible with the furnaces now in use.

According to the present invention the furnace pot is preferably given an oval shape in horizontal section and is supplied with a bridge across the center of the narrower dimension. Separate removable covers are supplied for the two halves of the furnace to permit basket charging of scrap. Through the central portion of each of these covers passes a set of three electrodes, each set having a triangular arrangement. The two sets of electrodes are spaced far enough apart so that areas toward the center of the oval pot can be used for decarburizing melted pig iron while scrap is being melted directly under the electrodes. By this arrangement the two operations can be conducted simultaneously and a high degree of efficiency obtained.

This invention can readily be understood by reference to the accompanying drawings in which we show a pot embodying our invention. This pot is intended to be tiltable for pouring the melted steel but since the mechanisms for carrying and actually tilting such a pot are well known in the art, they are not illustrated in the drawings.

In the drawings—

Fig. 1 is a plan view of the furnace pot embodying our invention;

Fig. 2 is a section on the broken line 2—2 of Fig. 1;

Fig. 3 is a section through the center of the furnace on its short axis;

Fig. 4 is a view directly through the center line of the furnace on its long axis showing the position of the electrodes after the melt is substantially completed, and Fig. 5 is a sectional view through the bridge of the furnace taken on line 5—5 of Fig. 1.

The furnace pot itself is designated by the numeral 10 and it preferably is formed with its bottom curved on both axes so that liquid pig iron charged into the furnace will collect in the central part of the furnace where it may be subjected to carburization. The curvature of the pot on the short axis is also of importance in making the pot readily tiltable in the usual manner.

Across the short axis of the furnace at its center are positioned two hollow beams 12 (see particularly Fig. 5). These are made hollow so that water can be circulated through them to prevent their melting. In addition, they are surrounded by ceramic work 14 which protects them from the direct heat of the furnace. Since these beams will be supported at the sides of the pot, they can readily be replaced if necessary. At the same time they help to strengthen the pot walls.

Resting on the central portion of these beams and on the sides of the pot are two covers 16 and 18. Around the outside of the pot and running through between the beams 12 toward the center of the pot are sand seal pockets 20. The covers 16 and 18 approximately meet at the center of the furnace but are curved along the center line of the short axis as clearly shown in Fig. 1. This permits the covers to be raised slightly to disengage the sand seals and then to be swung around by a crane or similar mechanism not shown. In Fig. 1 the position of the covers when swung away from the pots is indicated in broken lines. A fixed cover 24 fills the space between curvatures of the movable covers 16 and 18. Passing through the fixed cover 24 is a gas discharge pipe 26, several blowing pipes 28 (two are shown in the present drawing) and a separate pipe 30 which may be either used for blowing or may be used for the introduction of iron ore by means of oxygen. The pipes 28 may be double-walled, water-cooled copper pipes or any desired form of protected pipe such as have been used for this purpose may be used.

Passing through each of the movable covers 16 and 18 is a set of three electrodes 32 in triangular arrangement as shown. These are centered approximately in the centers of curvature of the end portions of the pot and it may be noted that the shortest distance from one set of electrodes to the other is more than twice the distance between two electrodes in a single set and each set has two electrodes facing two electrodes of the other set. In other words, the triangles have flat sides towards each other.

On one of the long sides of the furnace is a door 34 for slagging or introduction of materials as desired and on the opposite side of the furnace there is a spout 36 for tapping or pouring. Access doors 38 are also provided toward each end of one of the long sides of the furnace.

In operating the furnace, molten pig iron is introduced in any desired manner. For example, the furnace may be tilted slightly away from the spout 36 and molten pig iron may be introduced through this spout or it may be introduced through the door 34 or one of the covers 16 or 18 may be swung aside so the molten pig iron can be introduced from above. This molten pig iron will run toward the center of the furnace. The covers 16 and 18 are opened and scrap is introduced into the furnace directly below each of the sets of electrodes 32. This scrap may be introduced in a basket or in any desired manner (usually before the melted pig iron is introduced). The scrap preferably will be arranged directly below the electrodes and the outside limits of its position are indicated by the broken lines 40 of Fig. 1. The electrodes 32 are then brought down against the scrap and electric current is passed through to generate the necessary heat for melting the scrap.

It will be noted that large areas toward the central part of the furnace along the long axis but towards the sides along the short axis will not be occupied by the scrap and into these areas the melted pig iron will be introduced and it will have its surface exposed for blowing with oxygen introduced through the pipes 28. If desired, ore and oxygen can be introduced through the pipe 30. In Figs. 2 and 3 the scrap iron is designated by the numeral 42 and the pig iron by the numeral 44. At the time when the scrap is first being melted, the surface of the pig iron 44 will not be covered with slag and is readily accessible to the oxygen entering through the pipes 28. 46 indicates the tap hole connecting with the spout 36. In Fig. 4 the charge is shown as melted and slag now covers the charge as indicated at 48.

In comparing the operation of this furnace with an ordinary three-electrode furnace, it should be borne in mind that a great deal of the scrap must be heated and melted before the liquid pig iron is introduced and the scrap must be practically completely fused before introduction of oxygen can begin, whereas in our furnace the addition of liquid pig iron usually takes place shortly after the charging and melting of scrap has started. The melting of the scrap and the decarburizing of the liquid pig iron goes on simultaneously and it is found that a much more uniform electric load can be maintained with excellent utilization of the transformers. In other words, by using two electrode sets in one furnace and a very moderate transformer capacity, the same steel production is obtained as heretofore was had with a far higher transformer capacity, and the advantages of oxygen blowing are utilized in a very practical way.

Even though our furnace is especially designed for "hot metal" practice and the production of simple carbon steels in competition with the electric furnaces now in use, it will, if desired, maintain the special qualities of the usual electric furnace for production of finer and alloyed steels. It may therefore be used for such smelting without alterations. It may also be pointed out that in this furnace, one half can be operated independently of the other. Thus while one half is in full operation, the other half may be charged.

What we claim is:

1. An electric furnace comprising an elongated pot, a bridge across the pot, a plurality of removable covers for the pot resting on the sides of the pot and such bridge, said covers covering openings large enough to admit the insertion through them of masses of scrap steel, means in addition to said openings for introducing molten pig iron into the furnace, a fixed roof between the removable covers, a curved bottom for the pot, so that molten metal in the pot will tend to collect toward the center of the pot below such fixed roof, and a group of electrodes extending through each of the removable covers.

2. A structure as specified in claim 1 in which there are two covers and each group of electrodes comprises three electrodes.

3. A structure as specified in claim 2 in which the shortest distance from the electrodes in one set to the electrodes of the other set is more than twice the distance between any of the two electrodes in one set.

4. A structure as specified in claim 2 in which the electrodes in each set are arranged in a triangle with two electrodes in one set facing two electrodes of the other set.

5. A structure as specified in claim 3 in which there is a fixed roof between the two removable covers and a gas exhaust pipe extending up through such roof.

6. A structure as specified in claim 3 in which there is a fixed roof between the removable covers and pipes extending through such fixed roof for blowing oxygen against molten metal in the pot.

7. An electric furnace comprising an elongated pot, a bridge across the pot, a plurality of removable covers for the pot resting on the sides of the pot and on such bridge, said covers covering openings large enough to admit the insertion through them of masses of scrap steel, means in addition to said openings for introducing molten pig iron into the furnace, a fixed roof between the removable covers, a curved bottom for the pot so that molten metal in the pot will tend to collect toward the center of the pot below such fixed roof, pipes extending through such fixed roof for blowing oxygen against molten metal below such fixed roof and a group of electrodes extending through each of the removable covers whereby scrap introduced through the apertures covered by said covers may be melted while molten pig iron below the fixed roof is being blown with oxygen.

References Cited in the file of this patent

UNITED STATES PATENTS

| | | |
|---|---|---|
| 1,113,778 | Gray | Oct. 13, 1914 |
| 1,499,020 | Leonarz | June 24, 1924 |
| 1,626,263 | Brooke | Apr. 26, 1927 |
| 1,735,419 | Brooke | Nov. 12, 1929 |
| 2,119,262 | Arnold | May 31, 1938 |
| 2,334,275 | Michalet | Nov. 16, 1943 |
| 2,343,443 | Brooke | Mar. 7, 1944 |
| 2,382,534 | Baily | Aug. 14, 1945 |